United States Patent
Tamaki et al.

(10) Patent No.: US 8,242,630 B2
(45) Date of Patent: Aug. 14, 2012

(54) MULTIPLE POWER SUPPLY INTEGRATION APPARATUS, MULTIPLE POWER SUPPLY INTEGRATION SYSTEM, AND MULTIPLE POWER SUPPLY INTEGRATION PROGRAM

(75) Inventors: Kazutaka Tamaki, Tokyo (JP); Ichiro Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 285 days.

(21) Appl. No.: 12/722,855

(22) Filed: Mar. 12, 2010

(65) Prior Publication Data
US 2010/0231050 A1 Sep. 16, 2010

(30) Foreign Application Priority Data
Mar. 16, 2009 (JP) .................................. 2009-062563

(51) Int. Cl.
*H02J 1/10* (2006.01)

(52) U.S. Cl. .................. 307/43; 307/86; 307/45; 307/87

(58) Field of Classification Search .................... 307/43, 307/44, 45, 85, 86, 87, 82, 84
See application file for complete search history.

(56) References Cited

U.S. PATENT DOCUMENTS

| | | | | |
|---|---|---|---|---|
| 7,474,016 B2 * | 1/2009 | Wang et al. | ...................... | 307/45 |
| 7,566,980 B2 * | 7/2009 | Fein et al. | .......................... | 290/2 |
| 7,622,912 B1 * | 11/2009 | Adams et al. | ............ | 324/764.01 |
| 7,701,085 B2 * | 4/2010 | Ito et al. | .......................... | 307/29 |
| 7,958,229 B2 * | 6/2011 | Conway | ........................ | 709/224 |

FOREIGN PATENT DOCUMENTS

| | | |
|---|---|---|
| JP | 04-372528 | 12/1992 |
| JP | 2000-041336 | 2/2000 |
| JP | 2003-339118 | 11/2003 |
| JP | 2005-224009 | 8/2005 |
| JP | 2006-059126 | 3/2006 |
| JP | 2006-304402 | 11/2006 |
| JP | 2003-343416 | 12/2006 |

\* cited by examiner

*Primary Examiner* — Patrick Salce
(74) *Attorney, Agent, or Firm* — McDermott Will & Emery LLP

(57) ABSTRACT

A multiple power supply integration apparatus measures electric power and stability of power supplies, outputs thereof having irregularity. Based on measured values of the electric power and the stability, certainty of entire supply of the electric power when a use allocation rate of the power supplies is changed is indexed as an evaluation value. The multiple power supply integration apparatus adjusts each converter according to a use allocation rate corresponding to a largest evaluation value, thereby adjusting a magnitude of the electric power supplied from each power supply to a common power line.

7 Claims, 8 Drawing Sheets

MULTIPLE POWER SUPPLY INTEGRATION APPARATUS, MULTIPLE POWER SUPPLY INTEGRATION SYSTEM, AND MULTIPLE POWER SUPPLY INTEGRATION PROGRAM

BACKGROUND OF THE INVENTION

1. Field of the Invention

The present invention relates to a technique for controlling a power supply, and more particularly for controlling a plurality of power supplies.

2. Description of Related Art

The increase in energy demand is believed to continue in the future to follow development of the global economy, particularly economic growth of the Asian regions. For example, the International Energy Agency predicts that global demand of primary energy in the year 2030 increases by 66% from that in the year 2000. Under these social circumstances, expectation for renewable energy such as solar energy, wind power energy, biomass energy, geothermal energy, and tidal energy is growing.

Despite its excellent properties of being clean and permanently usable, the renewable energy is pointed out to have a problem of unstable output. For example, with wind power generation, it is difficult to stably supply electric power because of a change in output according to natural phenomenon, that is, wind force. Needless to say, the change in output according to seasons or time zone is statistically predictable to some extent. However, it is essentially difficult to predict up to a short-term change in electric power according to an instantaneous change in wind force or wind direction. The renewable energy tends to cause an instantaneous fluctuation (hereinafter, "sharp fluctuation") in the electric power. Therefore, it is difficult for the renewable energy to serve as a stable power supply.

A hybrid generation system that is a combination of a plurality of renewable energy sources such as wind power generation, solar photovoltaic power generation, and solar power generation has an advantage of being capable of stabilizing the whole output (Japanese Patent Application Laid-open Nos. 2003-339118, 2005-224009, and 2003-343416). However, as long as the hybrid power generation system uses the renewable energy as the energy sources, the system is susceptible to sharp fluctuation.

According to the method disclosed in Japanese Patent Application Laid-Open No. H4-372528, when power generated by wind power generation temporarily falls, a generator driven by a motor complements insufficient power (see paragraph [0012] or the like of Japanese Patent Application Laid-Open No. H4-372528). However, with the method disclosed in this conventional technique, there is no avoiding making the size of the motor and the generator larger as the size of the wind power generation is larger.

SUMMARY

The present invention has been achieved based on these conventional problems. A main object of the present invention is to control a plurality of power supplies and realize stable power supply as a whole.

In one embodiment, there is provided a multiple power supply integration apparatus. The multiple power supply integration apparatus includes a measurement unit that acquires an electric energy output within a unit time and stability indicating how small a change of electric power in the unit time is, from each of a plurality of irregular power supplies, outputs of the plurality of irregular power supplies having irregularity; an optimum allocation search unit that calculates an evaluation value serving as an index indicating the stability of supply of the electric power from the entire plurality of irregular power supplies while changing a use allocation rate of the plurality of irregular power supplies, based on the acquired electric energy and the acquired stability; and an allocation control unit that sets the use allocation rate of the plurality of irregular power supplies to a use allocation rate when an evaluation value satisfying a predetermined condition is calculated. The optimum allocation search unit calculates the electric energy output and stability per unit time of the entire plurality of irregular power supplies using the use allocation rate as a variable, and calculates the evaluation value using an evaluation function defined so that the evaluation value is larger as each of or one of the electric energy output and stability per unit time of the entire plurality of irregular power supplies is larger or higher.

The "irregular power supply" mentioned herein may indicate a power supply derived from renewable energy or a power supply, such as a fuel cell, the output of which is influenced by external temperature. The "plurality of irregular power supplies" may indicate power supplies of different types such as a solar photovoltaic power generation and a wind power generation or power supplies of the same type such as solar photovoltaic power generations. The "use allocation rate" may indicate a rate of electric power to be supplied from each of the irregular power supplies. The measurement unit may measure the electric energy and the stability by itself or acquire measured values from an external sensor. Examples of the "evaluation value satisfying a predetermined condition" include various evaluation values such as a largest evaluation value and an evaluation value equal to or larger than a predetermined threshold value, and an optimum condition can be arbitrarily set as the predetermined condition according to design. Calculation and setting of an appropriate use allocation rate for appropriately keeping the electric energy output and the stability as a whole based on generating situations of a plurality of irregular power supplies facilitate making the power supplied from the irregular power supplies stable.

The optimum allocation search unit may search the use allocation rate corresponding to the largest evaluation value by applying an optimization method based on metaheuristics to the evaluation function using the use allocation rate as a variable.

In this case, even when calculation of the use allocation rate is complicated, the use allocation rate close to an optimum use allocation rate can be easily calculated within a finite calculation time.

The measurement unit may regularly acquire the electric energy output and stability of each irregular power supply, and when the electric energy and stability of each irregular power supply are acquired, the optimum allocation search unit may search the optimum use allocation rate based on the acquired electric energy and stability.

In this case, it is possible to regularly monitor a generating situation of each irregular power supply and appropriately calculate the optimum use allocation rate. When measurement and calculation is made frequently, it is possible to easily gather predictive information on a sharp fluctuation in advance and easily prevent the sharp fluctuation. While the "optimum use allocation rate" is preferably an actually optimum use allocation rate, the optimum use allocation rate suffices to be at least a use allocation rate close to the optimum use allocation rate.

The optimum allocation search unit may normalize the electric energy and the stability to dimensionless values, respectively, and the optimum allocation search unit may calculate the evaluation value using an evaluation function defined so that the evaluation value is larger as an average value of the normalized value of the electric energy output and that of the stability per unit time of the entire plurality of irregular power supplies is larger.

The electric energy and the stability originally differ in unit; however, when the electric energy and the stability are converted into dimensionless values, respectively using the predetermined conversion function, both can be easily dealt with based on the same standard. In this case, the evaluation value can be set larger as the electric energy and the stability of the entire system are higher.

The optimum allocation search unit may normalize the electric energy and the stability to dimensionless values, respectively, and the optimum allocation search unit may calculate the evaluation value using an evaluation function defined so that the evaluation value is larger as the lower one of the normalized value of the electric energy and that of the stability per unit time of the entire plurality of irregular power supplies is larger.

In this case, it is possible to set the evaluation value to be small when either the electric energy or the stability of the entire system is too low.

An aspect in which an arbitrary combination of the constituent elements mentioned above and expression of the present invention are converted among a method, an apparatus, a system, a recording medium, a computer program or the like is also effective as another aspect of the present invention.

According to the present invention, it is possible to easily realize stable power supply as the entire system by controlling a plurality of power supplies.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

Figure 1:
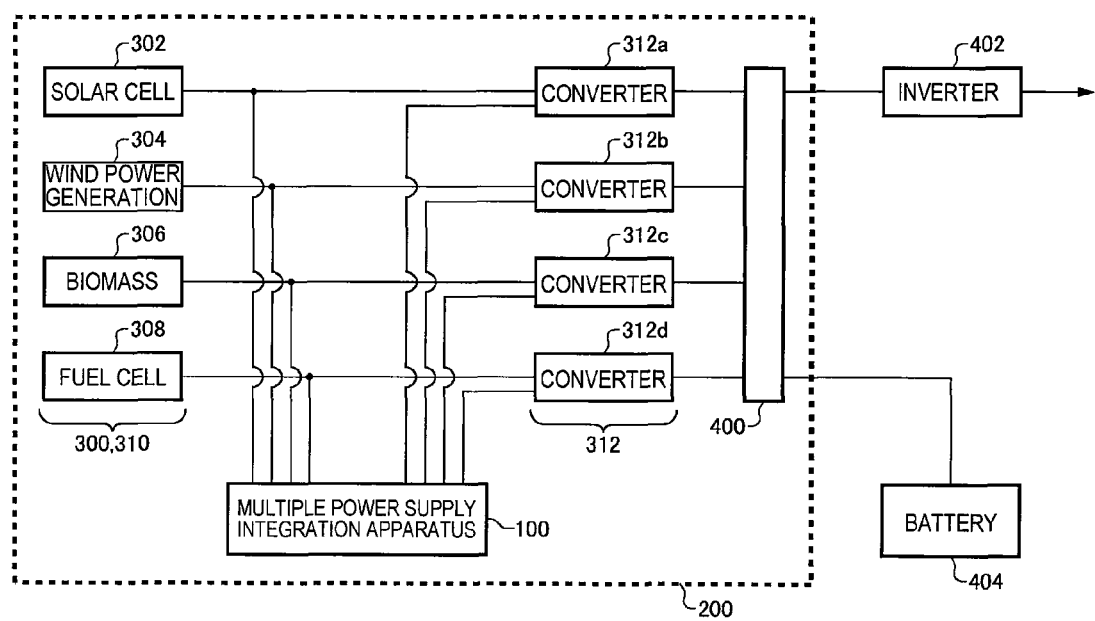
FIG. 1 is a hardware configuration diagram of a multiple power supply integration system.

FIG. 1 is a hardware configuration diagram of a multiple power supply integration system 200 according to an embodiment of the present invention. The multiple power supply integration system 200 realizes stable power supply from the entire system by controlling a plurality of power supplies. In FIG. 1, "plurality of power supplies" corresponds to a solar cell 302, a wind power generation 304, a biomass 306, and a fuel cell 308 (each of which is simply referred to as "the power supply 300" unless specified otherwise). A power supply group 310 collectively indicates the plural power supplies 300.

The power supplies 300 generate electric power individually without interfering with one another. The power generated by each power supply 300 is referred to as "the source power". The wind power generation 304, the biomass 306, and the fuel cell 308 are connected to a common power line 400 via converters 312a to 312d (each of which is simply referred to as "the converter 312"), respectively. The common power line 400 is a power line that supplies direct-current (DC) electric power. The converter 312 rectifies and smoothes the source power generated by each power supply 300 and supplies the rectified and smoothed power to the common power line 400 as DC power. The DC power actually supplied from each power line 300 to the common power line 400 is referred to as "the responsible power". A sum of the responsible power (hereinafter, "the total power") is supplied to another electric device via an inverter 402 from the common power line 400. All of or a part of the total power can be sold.

The multiple power supply integration system 200 includes a plurality of power supplies 300, a multiple power supply integration apparatus 100, and the common power line 400. The source power of each power supply 300 changes temporally. Some power supplies 300 may generate high source power and the other power supplies 300 may generate only low source power. Further, some power supplies 300 may have large changes in the source power per unit time and the other power supplies 300 may be relatively stable in the source power. The multiple power supply integration apparatus 100 monitors a power generating situation of each power supply 300 and determines a use allocation rate of the power supplies 300 based on a measurement result.

More specifically, the multiple power supply integration apparatus 100 regularly measures "quantitative magnitude of the source power" and "magnitude of change in the source power" of each power supply 300. In the present embodiment, the multiple power supply integration apparatus 100 measures these magnitudes at 1-minute intervals. The "quantitative magnitude of the source power" means an electric energy output per second (W·s) generated for a measurement time of 1 minute. In other words, the "quantitative magnitude of the source power" is average electric power. The "quantitative magnitude of the source power" is simply referred to as "the source power (W)".

The "magnitude of change in the source power" means a degree of the change in the source power for a measurement time of 1 minute. The multiple power supply integration apparatus 100 acquires source power at 1-second intervals for the measurement time of 1 minute. In case an average value of the source power is 1000 W, a minimum value thereof is 900 W, and a maximum value thereof is 1050 W in a total of 60 sampled values, the source power changes in a range from −10% to +5% of the average value and the degree of change is, therefore, 15% (=10+5). In the present embodiment, the multiple power supply integration apparatus 100 measures "stability" by calculating stability=1/(1+degree of change) based on this degree of change. When the degree of change is smaller, the stability is higher. The multiple power supply integration apparatus 100 acquires the degree of change in the source power (stability) per minute of each of the solar cell 302, the wind power generation 304, the biomass 306, and the fuel cell 308. The multiple power supply integration apparatus 100 may measure the degree of change by itself or acquire a measured value from an external sensor (not shown). The "degree of change" can be defined in the other ways than that described above. For example, variance or standard deviation of the sampled source power may be defined as the "degree of change". In any case, it suffices that the "degree of change" indicates how fluctuation in the source power is large in magnitude or large in amount within a predetermined time. The same is true for "stability" and the stability suffices to be an index indicating how fluctuation in the source power is small in magnitude or small in amount within a predetermined time. While a length of the measurement time is set to 1 minute in the present embodiment, the length of 1 minute is only an example and an optimum length of the measurement time can be determined based on performance, operating environment, operating conditions and the like of each power supply 300 of the multiple power supply integration apparatus 100.

The power supply 300 having high source power and high stability is an ideal power supply. However, in a case of the power supply 300 derived from the renewable energy, the source power and the stability (the degree of change) change temporally. An output from the fuel cell 308 changes according to external temperature. The multiple power supply integration apparatus 100 appropriately changes the use allocation rate of the respective power supplies 300 in view of generating situations of the power supplies 300, thereby maintaining stable power supply from the power supply group 310 as a whole.

For example, the rated power of each power supply 300 is assumed as 1500 W. The total power to be output to the common power line 400 is assumed as, for example, 4000 W. When the use allocation rate of the solar cell 302, the wind power generation 304, the biomass 306, and the fuel cell 308 is 1:1:1:1, it suffices that each power supply 300 provides responsible power of 1000 W.

However, some of the power supplies 300 cannot be expected to output power of 1000 W and the others can be surely expected to output power higher than 1000 W. For example, when the wind power generation 304 can be expected to output power equal to or higher than 1200 W and the biomass 306 can be expected to output only power of about 800 W to the worst, the multiple power supply integration apparatus 100 changes the use allocation rate of the solar cell 302, the wind power generation 304, the biomass 306, and the fuel cell 308 to 1:1.2:0.8:1. At this time, the multiple power supply integration apparatus 100 adjusts a maximum value of the responsible power of the wind power generation 304 to 1200 W by increasing power conversion efficiency of the converter 312b corresponding to the wind power generation 304, and adjusts a maximum value of the responsible power of the biomass 306 to 800 W by decreasing power conversion efficiency of the converter 312c corresponding to the biomass 306. By so adjusting, the multiple power supply integration apparatus 100 maintains the total power of 4000 W. That is, a plurality of power supplies 300 complement one another, thereby making the total power stable. A specific method of calculating the use allocation rate is described later in detail. Even when the source power of the biomass 306 is eventually equal to or higher than 800 W, the converter 312c adjusts the power that can be supplied to the common power line 400 as the responsible power of the biomass 306 up to 800 W.

A magnitude of the total power (output value) such as 4000 W is not necessarily fixed to a certain one. For example, when generating situations of the respective power sources 300 are good, the total power (output value) of the multiple power supply integration system 200 can be gradually increased. When the total power has no sharp fluctuation, a purchaser of the power can be notified of to what degree the total power can be supplied in advance. Alternatively, a larger value (for example, 4100 W) than the necessary total power (4000 W) can be set and an excess can be discharged to a battery 404.

As the power supplies 300, various other power supplies derived from the renewable energy such as tidal energy, geothermal energy, and snow or ice energy are possibly used. Furthermore, the multiple power supply integration system 200 can control not only the renewable energy but also power supplies exhibiting irregularity.

Figure 2:
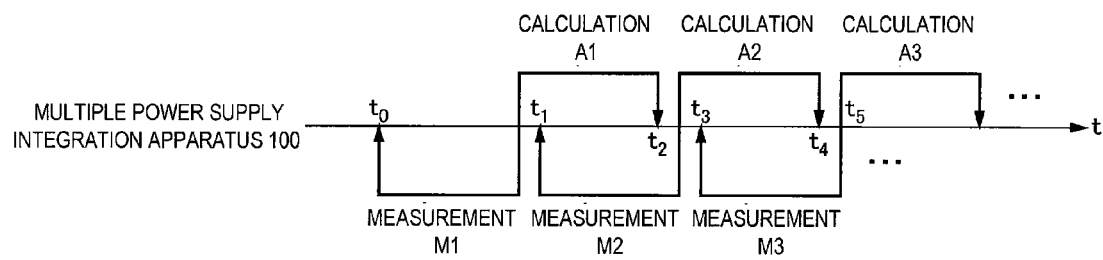
FIG. 2 is a time chart showing a measurement and calculation process for adjusting the use allocation rate.

FIG. 2 is a time chart showing a measurement and calculation process for adjusting the use allocation rate. First, from a time t0 to a time t1, the multiple power supply integration apparatus 100 measures the source power and the stability of each power supply 300. The measurement result is referred to as "M1". In the present embodiment, measurement period from the time t1 to t1 is 1 minute. Next, for the measurement period from the time t1 to t2, the multiple power supply integration apparatus 100 calculates a use allocation rate based on the measurement result M1. This calculation process is referred to as "A1". The multiple power supply integration apparatus 100 determines the use allocation rate by a time t2, controls each converter 312, and adjusts the use allocation rate. In parallel to the calculation process A1, the multiple power supply integration apparatus 100 measures again the source power and the stability from the time t1 to a time t3. The measurement result is referred to as "M2". From the time t3 to a time t4 when the multiple power supply integration apparatus 100 is completed with the measurement, the multiple power supply integration apparatus 100 performs a calculation process A2 for calculating a use allocation rate based on the measurement result M2. At the time t4, the use allocation rate is re-adjusted. In this way, the multiple power supply integration apparatus 100 repeatedly performs measurement of the source power and the like and calculation of the use allocation rate.

Figure 3:
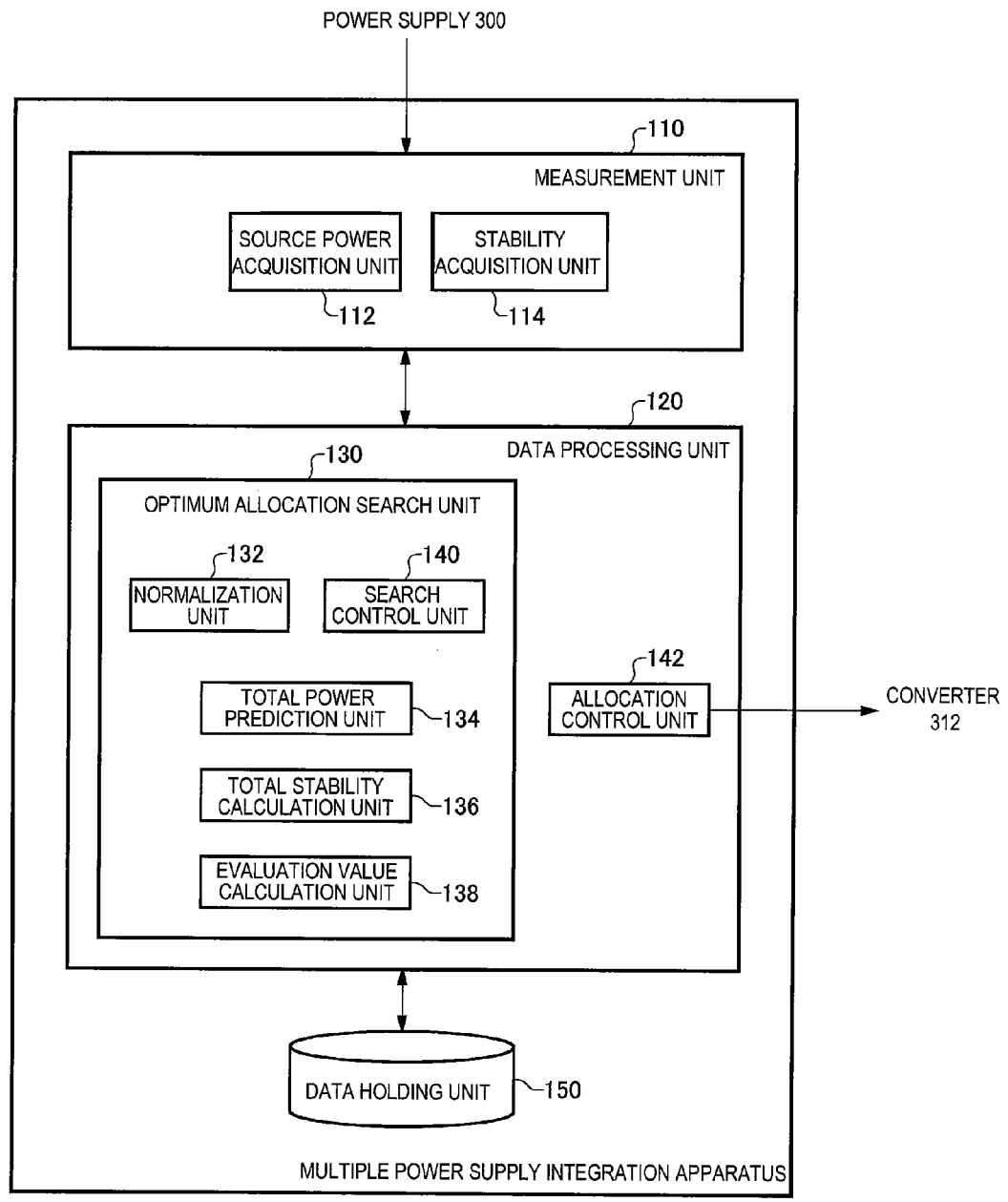
FIG. 3 is a functional block diagram of the multiple power supply integration apparatus.

FIG. 3 is a functional block diagram of the multiple power supply integration apparatus 100. As hardware, the multiple power supply integration apparatus 100 can be realized by elements including a CPU of a computer. As software, the multiple power supply integration apparatus 100 can be realized by a program that functions to transmit and receive data and the like. FIG. 3 and the like to be described below illustrate functional blocks realized in cooperation with the hardware or software. Therefore, these functional blocks can be realized in various fashions by combining the hardware or software. Configurations of respective functional blocks are mainly described below. Specific and detailed processing contents follow the descriptions of the configurations.

The multiple power supply integration apparatus 100 includes a measurement unit 110, a data processing unit 120, and a data holding unit 150. The measurement unit 110 is responsible for a measurement process. The data processing unit 120 performs various data processes based on data acquired from the measurement unit 110 and the data holding unit 150. The data processing unit 120 also functions as an interface between the measurement unit 110 and the data holding unit 150. The data holding unit 150 is a storage area for holding therein various pieces of data.

The measurement unit 110 includes a source power acquisition unit 112 and a stability acquisition unit 114. The source power acquisition unit 112 measures the source power of each power supply 300. The stability acquisition unit 114 measures the degree of change in (the stability of) each power supply 300. The measured values are registered in the data holding unit 150 via the data processing unit 120. The measurement unit 110 may be provided to correspond to every power supply 300.

The data processing unit 120 includes an optimum allocation search unit 130 and an allocation control unit 142. The optimum allocation search unit 130 calculates an optimum use allocation rate of the power supplies 300 based on the measurement result. The allocation control unit 142 adjusts each converter 312 and whereby, sets the use allocation rate of the power supplies 300 based on the optimum use allocation rate calculated by the optimum allocation search unit 130.

The optimum allocation search unit 130 includes a normalization unit 132, a total power prediction unit 134, a total stability calculation unit 136, an evaluation value calculation unit 138, and a search control unit 140. The total power prediction unit 134 calculates a predicted value of the total power (hereinafter, "total power predicted value") based on the source power of each power supply 300. The total stability calculation unit 136 calculates a predicted value of the stability of the total power (hereinafter, "total stability predicted value") as the entire multiple power supply integration system 200 based on the source power and the degree of change in each power supply 300. The normalization unit 132 normalizes these predicted values to dimensionless values in ranges of 0 to 1, respectively. The evaluation value calculation unit 138 calculates an "evaluation value" based on the normalized value of each predicted value. The evaluation value indicates a total evaluation of the predicted value. The search control unit 140 integrally controls optimum search processes of the optimum allocation search unit 130.

The specific method of calculating the use allocation rate is described next. For clarity of the calculation principle, the method of calculating use allocation rate of the two power supplies 300, that is, power supplies 300A and 300B is described. Note that the principle of the calculation method is the same even when the number of power supplies 300 is three or more.

First, the use allocation rate is set as a variable r, and a ratio in responsible power of the power supply 300A to power supply 300B is represented by $r:1-r$ ($0 \leq r \leq 1$). The measurement unit 110 measures source power PA and stability SA of the power supply 300A and source power PB and stability SB of the power supply 300B. The total power prediction unit 134 calculates a total power predicted value UP(r) based on these measured values using the following Equation (1).

$$UP(r) = r \cdot PA + (1-r) \cdot PB \quad \text{[Equation (1)]}$$

The total power predicted value UP(r) indicates a magnitude of the total power at the use allocation rate r on the premise of the source power PA and PB obtained from the measurement result. The total power predicted value UP(r) is a function of r. The total power prediction unit 134 changes a use allocation rate r and calculates the total power predicted value UP(r) for each of the use allocation rate r, on the premise of PA and PB. As obvious from the Equation (1), when higher responsible power is allocated to the power supply 300 having higher source power, the total power predicted value UP(r) is greater. For example, when PA>PB, the total power predicted value UP(r) is greater when the use allocation rate r is set higher.

Next, the total stability calculation unit 136 calculates a total stability predicted value US(r) using the following Equation (2).

$$US(r) = \frac{r \cdot PA \cdot SA + (1-r) \cdot PB \cdot SB}{UP(r)} \quad \text{[Equation (2)]}$$

The total stability predicted value US(r) indicates stability of the total power at the use allocation rate r on the premise of the source power PA and PB obtained from the measurement result. The probability that the planned total power can be supplied is higher as the total stability predicted value US(r) is greater. The total stability predicted value US(r) is also a function of r. A numerator of the Equation (2) is greater when the higher responsible power is allocated to the power supply having a greater product between the source power and the stability. However, when the total power predicted value UP(r) is greater, the total stability predicted value US(r) is made rather smaller.

The total power prediction unit 134 and the total stability prediction unit 136 calculate the total power predicted value UP(r) and the total stability predicted value US(r) for every use allocation rate r while changing the use allocation rate r at 0.01 intervals in the range of 0 to 1, respectively. The normalization unit 132 normalizes the total power predicted value UP(r) and the total stability predicted value US(r) each in the range of 0 to 1.

Figure 4A:
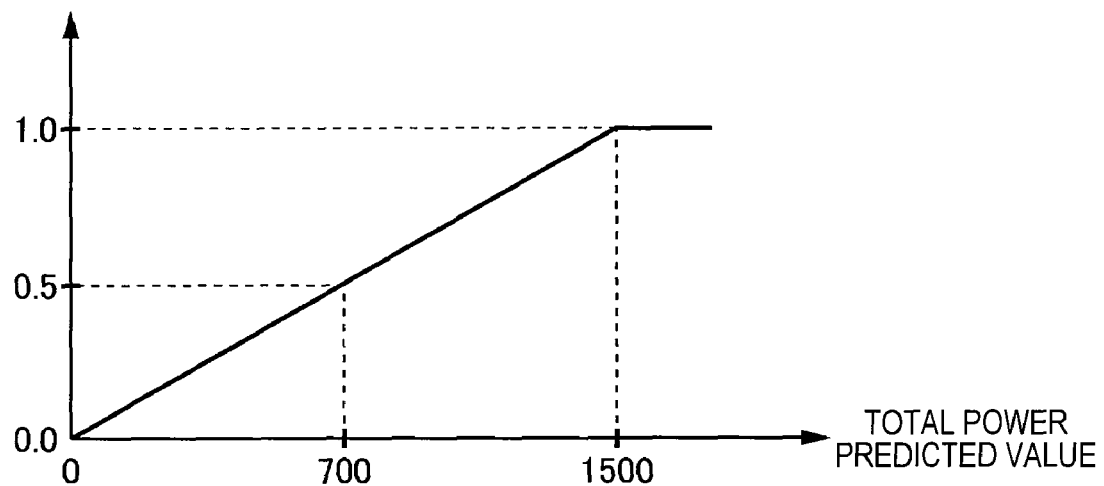
FIG. 4A is a graph showing the relationship between a total power predicted value and a normalized value of the total power predicted value.

FIG. 4A is a graph showing the relationship between a total power predicted value and a normalized value of the total power predicted value. It is assumed that rated power of each of the power supply 300A and 300B is 1500 W. According to the correspondence relationship shown in the graph of FIG. 4A, the normalization unit 132 normalizes the total power predicted value UP(r). When the total power predicted value UP(r) is 0, the normalized value is 0. When the total power predicted value UP(r) is equal to or greater than 1500, the normalized value is 1. It suffices to arbitrarily determine the relationship between the total power predicted value UP(r) and the normalized value according to the number, types, specifications and the like of power supplies 300. It is preferable that the relationship between the total power predicted value UP(r) and the normalized value is positive correlation.

Figure 4B:
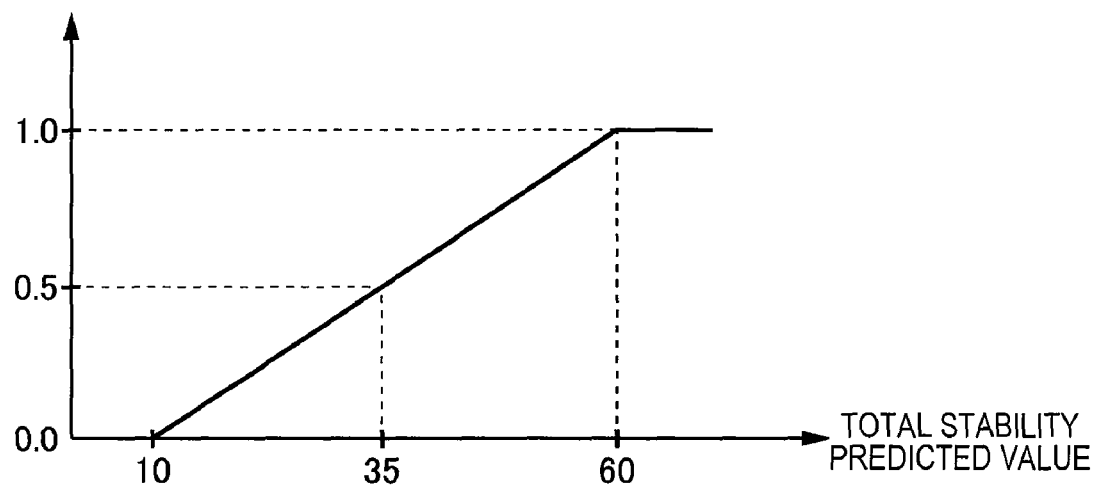
FIG. 4B is a graph showing the relationship between a total stability predicted value and a normalized value of the total stability predicted value.

FIG. 4B is a graph showing the relationship between a total stability predicted value and a normalized value of the total stability predicted value. According to the correspondence relationship shown in the graph of FIG. 4B, the normalization unit 132 normalizes the total stability predicted value US(r). When the total stability predicted value US(r) is equal to or smaller than 10, the normalized value is 0. When the total stability predicted value US(r) is equal to or greater than 60, the normalized value is 1. It suffices to arbitrarily determine the relationship between the total stability predicted value US(r) and the normalized value according to the number, types, specifications and the like of power supplies 300, similarly to determination of the total power predicted value UP(r). It is preferable that the relationship between the total stability predicted value US(r) and the normalized value is positive correlation.

The normalized total power predicted value and the normalized total stability predicted value are referred to as "uP(r)" and "uS(r)", respectively. The evaluation value calculation unit 138 calculates an evaluation value E(r) based on the normalized total power predicted value uP(r) and the normalized total stability predicted value uS(r) using the following Equation (3).

$$E(r) = \alpha \cdot \min(uP(r), uS(r)) + \frac{1-\alpha}{2} \cdot (uP(r) + uS(r)) \quad \text{[Equation (3)]}$$

The evaluation value E(r) indicates a total evaluation as the generation system, that is, the multiple power supply integration system 200 when the use allocation rate r is set on the premise of the source power PA and PB. The evaluation value E(r) indicates how high the probability that the multiple power supply integration system 200 can stably maintain sufficient power supply is. That is, the evaluation value E(r) indicates how low the probability that the total power suddenly drops due to a sharp fluctuation is. The use allocation rate r when the evaluation value E(r) is the greatest is assumed as the optimum use allocation rate. Note that a coefficient α in the Equation (3) is a constant and is arbitrarily selected in a range of 0 to 1.

In the Equation (3), a first term is a term obtained by multiplying minimum values of uP(r) and uS(r) by the coefficient α. When one of uP(r) and uS(r) is a large value but the other is a small value, that is, when one of the normalized total power predicted value uP(r) and the normalized total stability predicted value uS(r) is small, the evaluation value E(r) is small. When either uP(r) or uS(r) is 0, the evaluation value E(r) is assumed as 0 irrespective of a value of a second term.

The second term is a term obtained by multiplying an average of uP(r) and uS(r) by a coefficient (1−α). When uP(r) and uS(r) are larger, that is, a sum of the normalized total power predicted value uP(r) and the normalized total stability predicted value uS(r) is larger, the evaluation value E(r) is larger.

These equations are based on a Fuzzy theory. For example, when the source power PA is larger than the source power PB, and the stability SA is larger than the stability SB, the total power predicted value UP(r) is larger as long as the responsible power for the power supply 300A is set higher than that for the power supply 300B. However, when the responsible power for the power supply 300A is excessively set higher, the total stability predicted value US(r) decreases and the evaluation value E(r) possibly decreases. When the stability SA is decreasing despite the high source power PA, the total stability predicted value US(r) increases and the evaluation value E(r) is possibly higher by increasing the responsible power for the power supply 300B. In this way, the responsible power for a plurality of power supplies 300 is kept in balance based on the source power and the stability of each power supply 300. By changing the use allocation rate r, it is possible to realize stable supply of the total power while the source power of other power supplies 300 complements an amount of or a change in the source power of a certain power supply 300.

When the coefficient α is set to satisfy α<0.5, the second term of the Equation (3) has a greater influence on the evaluation value E(r). When the coefficient α is set to satisfy α≧0.5, the first term has a greater influence on the evaluation value E(r). In the present embodiment, the coefficient α is set to 0.7. The search control unit 140 controls the normalization unit 132, the total power prediction unit 134, the total stability prediction unit 136, and the evaluation value calculation unit 138 to calculate UP(r), US(r), uP(r), uS(r), and E(r) while changing the use allocation rate r to 0.00, 0.01, 0.02, . . . , and 1.00. The search control unit 140 determines the use allocation rate r corresponding to the largest E(r) as the optimum use allocation rate.

In a case of the power supplies 300A and 300B, the use allocation rate r is changed from 0.00 to 1.00 and it is, therefore, necessary to make 101 calculations in all. When three power supplies 300, that is, power supplies 300A, 300B, and 300C are power supplies to be controlled, two variables r and s are used to determine a use allocation rate of r:s:{1−(r+s)}. That is, it is necessary to make 5151 calculations in all for (r, s)=(0.00, 0.00), (0.00, 0.01), . . . , and (1.00, 0.00). The number 5151 is based on 1+2+ . . . +101=5151. When the number of power supplies 300 is four, it is necessary to make 166,650 calculations. A calculation amount rapidly increases when a calculation width of r and the number of power supplies 300 increases.

It is preferable to verify all possible use allocation rates when the number of power supplies 300 is small or the multiple power supply integration apparatus 100 has sufficient processing capability. Nevertheless, it is often difficult to calculate the optimum use allocation rate within a finite calculation time. In the present embodiment, a type of a metaheuristic solution referred to as "Tabu search" is applied to a method of searching the optimum use allocation rate so as to determine the optimum use allocation rate r or, to be specific, to determine the use allocation rate as close as the optimum use allocation rate possible within the limited calculation time.

Figure 5:
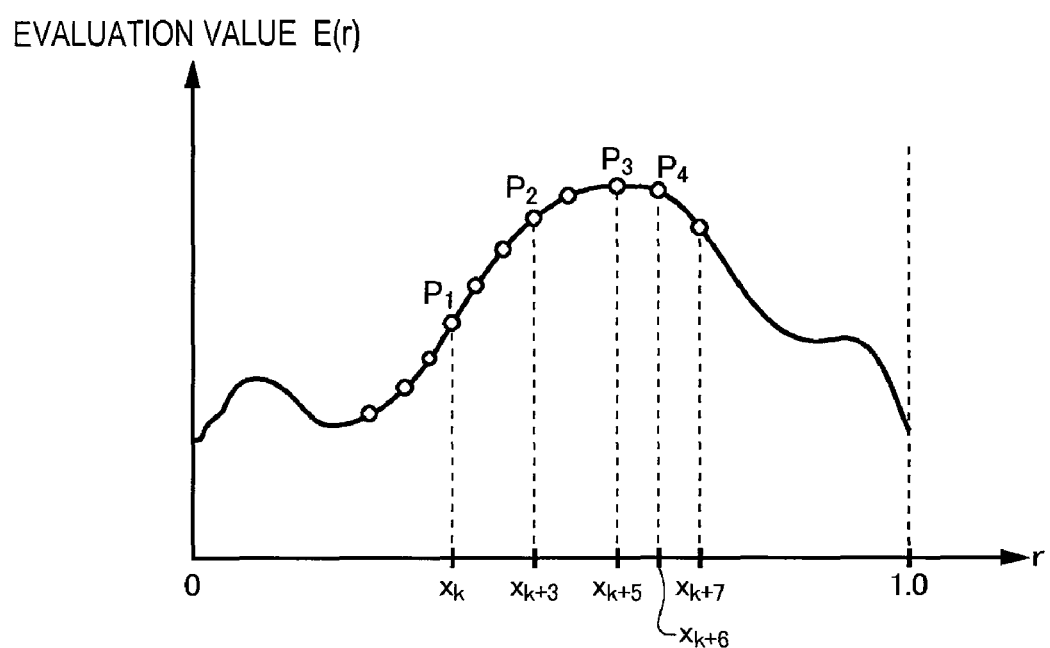
FIG. 5 is a graph for describing the method of searching the optimum use allocation rate by the Tabu search.

FIG. 5 is a graph for describing the method of searching the optimum use allocation rate r by the Tabu search. It is assumed herein the two power supplies 300, that is, the power supplies 300A and 300B are to be controlled. In the graph of FIG. 5, a horizontal axis indicates the use allocation rate r and a vertical axis indicates the evaluation value E(r). The search control unit 140 determines an initial value of the use allocation rate r. It is assumed herein that r=xk (corresponding to P1 shown in FIG. 5) as a reference point. The search control unit 140 controls the evaluation value calculation unit 138 to calculate evaluation values E(r) for neighborhood points of the reference point besides the evaluation value E(r) for r=xk. In this case, the search control unit 140 controls the evaluation value calculation unit 138 to calculate evaluation values E(r) for a total of seven points of r=xk−3, xk−2, xk−1, xk, xk+1, xk+2, and xk+3, respectively.

Among the seven points, the search control unit 140 records the use allocation rate r corresponding to the largest E(r). In FIG. 5, E(xk+3) is the largest value (corresponding to P2 shown in FIG. 5). The search control unit 140 records r=xk+3 and E(xk+3). The search control unit 140 also records a movement of the reference point of r=xk→xk+3 in a finite length list referred to as "Tabu list".

The search control unit 140 sets the use allocation rate to r=xk+3, and controls the evaluation value calculation unit 138 to calculate revaluation values E(r) corresponding to r=xk+3 and neighborhood points, respectively. In a case of FIG. 5, the search control unit 140 controls the evaluation value calculation unit 138 to calculate the evaluation values E(r) corresponding to a total of seven points of r=xk, xk+1, xk+2, xk+3, xk+4, xk+5, and xk+6, respectively. However, for the evaluation values E(xk), E(xk+1), E(xk+2), and E(xk+3), the previous calculation result is available.

Among these seven points, the search control unit 140 records the use allocation rate r corresponding to the largest E(r). In the case of FIG. 5, the evaluation value E(xk+5) is the largest value (corresponding to P3 in FIG. 5). Since E(xk+5)>E(xk+3), the search control unit 140 records r=xk+5 and E(xk+5) as the point corresponding to the largest evaluation value and the largest evaluation value, respectively. The search control unit 140 also records a movement of the reference point of r=xk+3→xk+5 in the Tabu list. Since the Tabu list is a finite length list, the search control unit 140 discards the oldest record when it is necessary.

Next, the search control unit 140 controls the evaluation calculation unit 138 to calculate evaluation values E(r) corresponding to the reference point of r=xk+5 (corresponding to P3 in FIG. 5) and neighborhood points of the reference point, respectively. In the case of FIG. 5, there is no use allocation rate r corresponding to the evaluation value E(r) equal to or larger than E(xk+5). The search control unit 140 sets a next reference point r to r=xk+6 (corresponding to P4 in FIG. 5) next to r=xk+5, and records a movement of the reference point of r=xk+5→xk+6 in the Tabu list. That is, the search continues even when a larger evaluation value E(r) is not discovered. However, when the movement of the reference point of r=xk+5→xk+6 is already recorded in the Tabu list, the search control unit 140 sets the reference point r to r=xk+7 next to r=xk+6. This is intended not to repeat the same process.

In this way, the search control unit 140 controls the evaluation value calculation unit 138 to search a larger evaluation value E(r). Furthermore, using the Tabu list, it is prevented for the use allocation rate r from staying in a local range. It is possible to search a true optimum solution or a solution as close as the true optimum solution possible since the search is based on the following algorithm. Even when a plurality of local maximal points of the evaluation value E(r) is present, a search range can be easily extended up to another local maximal point without determining the optimum solution when one local maximal point is discovered. Such a method of searching the use allocation rate r cannot always search the largest evaluation value E(r) but is effective in that the evaluation value E(r) close to the largest evaluation value can be searched within the finite calculation time. In this specification, not only the use allocation rate r corresponding to the largest evaluation value E(r) but also that corresponding to the largest evaluation value E(r) detected within the finite calculation time are also referred to as "optimum use allocation rate", although the latter value may not be optimum in a strict sense.

Figure 6:
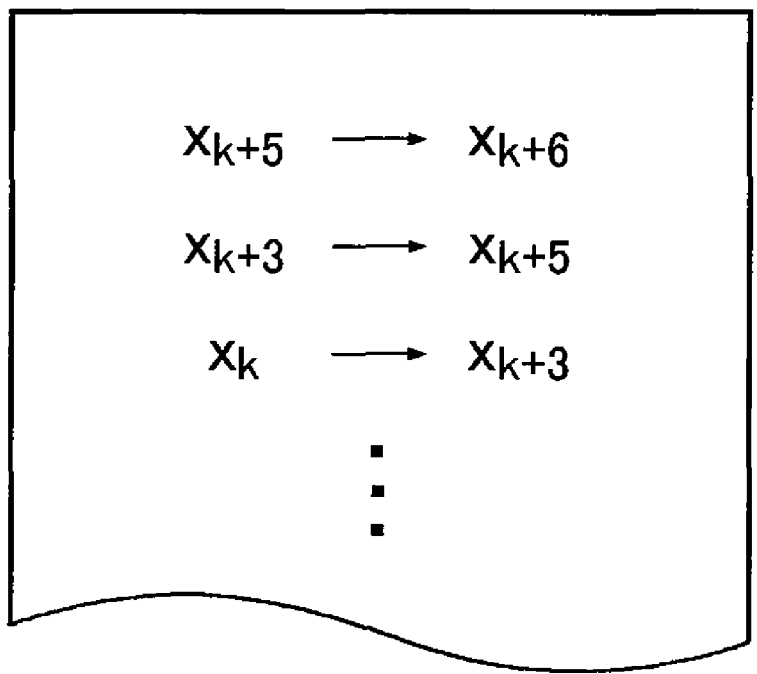
FIG. 6 shows the Tabu list.

FIG. 6 is a chart showing the Tabu list. As described above, the search control unit 140 moves the reference point of the use allocation rate r such as xk→xk+3, xk+3→xk+5, and xk+5→xk+6. Such movements of the reference point are registered in the Tabu list in this order. The movements recorded in the Tabu list are not repeatedly made. This can prevent the reference point from staying in a local range. However, movement histories that can be registered in the Tabu list are finite. Due to this, when the number of movement histories reaches an upper limit, the search control unit 140 discards the oldest movement history whenever registering a new movement history in the Tabu list.

Figure 7:
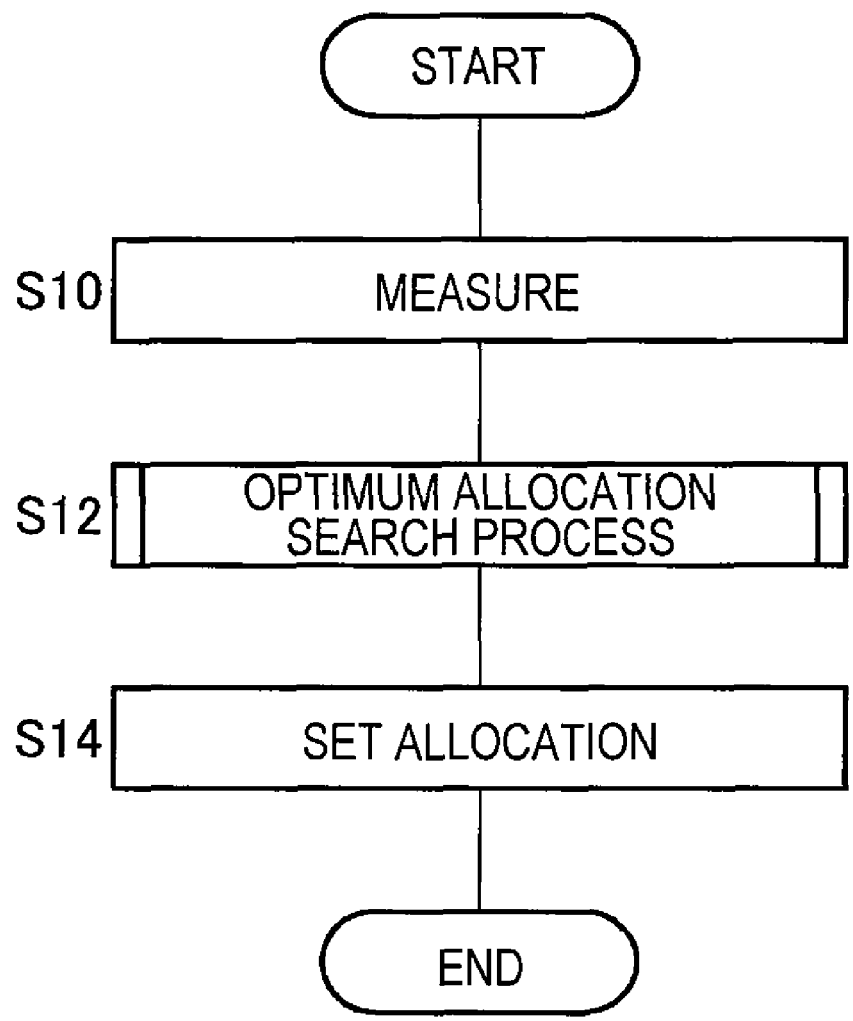
FIG. 7 is a flowchart showing a process of adjusting the use allocation rate.

FIG. 7 is a flowchart showing a process of adjusting the use allocation rate. The calculation unit 110 measures the source power and the stability of each power supply 300 (S10). The optimum allocation search unit 130 calculates the optimum use allocation rate based on the measurement result, which is an optimum allocation search process (S12). The optimum allocation search process at S12 is described later in detail with reference to FIG. 8. The allocation control unit 142 sets the use allocation rate calculated at S12 to each converter 312 (S14). This whole process is repeatedly performed at certain time intervals. Note that a next measurement process (S10) starts at start of the optimum allocation search process (S12). This timing is as described above with reference to FIG. 2.

Figure 8:
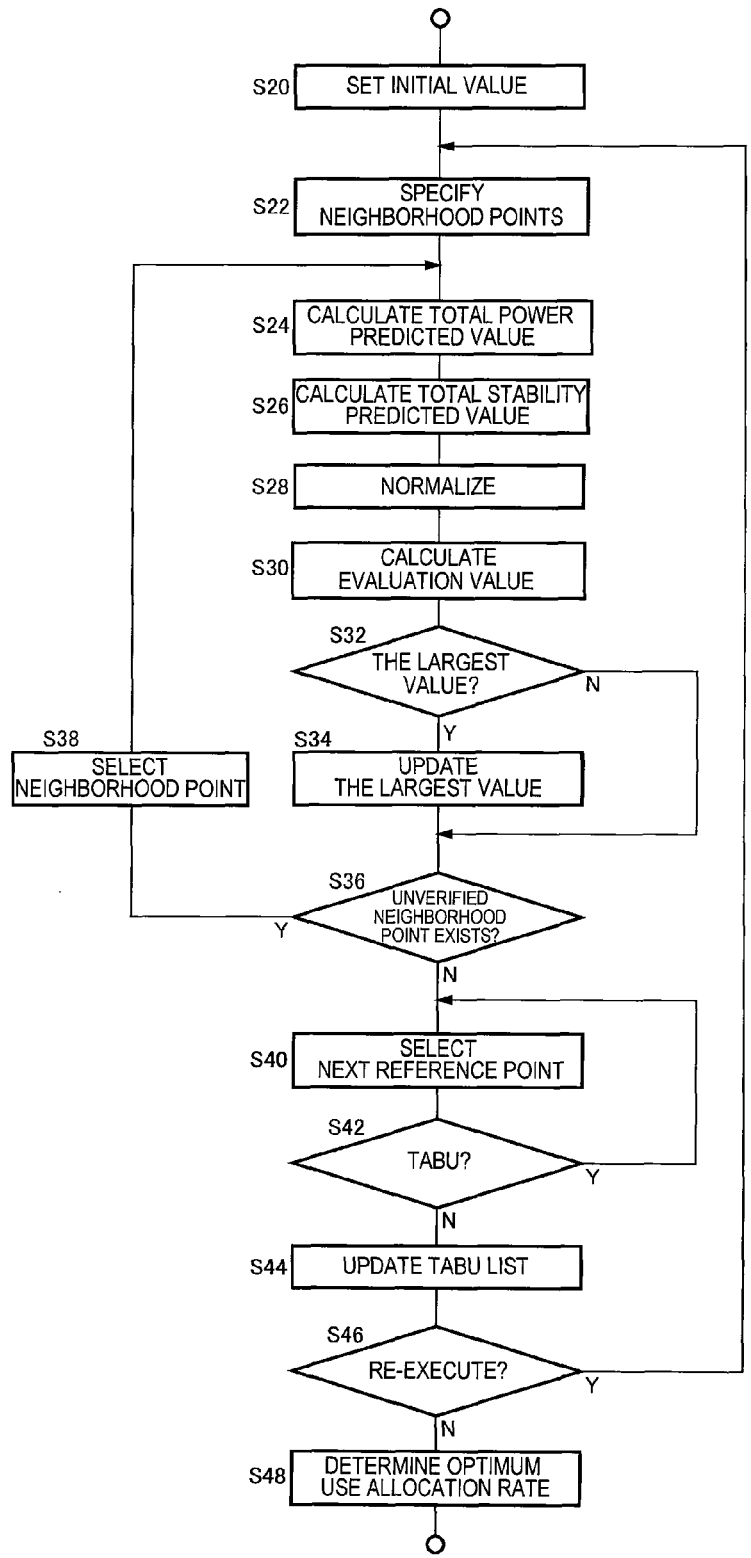
FIG. 8 is a flowchart showing the optimum allocation search process at S12 shown in FIG. 7 in detail.

FIG. 8 is a flowchart showing the optimum allocation search process at S12 shown in FIG. 7 in detail. First, the search control unit 140 sets r0 as the initial value of the use allocation rate (S20). This use allocation rate r0 is the reference point. In the optimum allocation search process based on a first measurement result, the initial value is set to a predetermined value such as r=0.00. In the optimum allocation search processes based on the second and following measurement results, the optimum use allocation rate determined in the previous optimum allocation search process is set as the initial value.

The search control unit 140 specifies a plurality of use allocation rates r as neighborhood points of the reference point r0 (S22). The search control unit 140 may specify a plurality of use allocation rates r at random from an arbitrary range including r0. The total power prediction unit 134 calculates a total power predicted value UP(r0) with the reference point r0 used a verification target (S24). The total stability prediction unit 136 calculates a total stability predicted value US(r0) (S26). The normalization unit 132 normalizes these predicted values UP(r0) and US(r0) and obtains normalized predicted values sP(r0) and uS(r0) (S28). The evaluation value calculation unit 138 calculates an evaluation value E(r0) (S30). When this evaluation value E(r0) is the largest value so far (Yes at S32), the search control unit 140 records r0 and E(r0) in the Tabu list (S34). When this evaluation value E(r0) is not the largest value so far (No at S32), the process skips step S34.

When an unverified point remains among the neighborhood points selected at S22 (Yes at S36), the search control unit 140 selects a new neighborhood point to be verified (S38). Subsequently, the process from S24 to S34 is performed for this new neighborhood point. In this way, the use allocation rate r corresponding to the largest evaluation value E(r) is discovered from among r0 and the neighborhood points of r0.

The search control unit 140 sets the use allocation rate r corresponding to the largest evaluation value E(r) as a new reference point (S40). However, when such a movement to the use allocation rate r is already registered in the Tabu list (Yes at S42), the search control unit 140 selects another reference point (S40). When search control unit 140 selects a reference point r1 that is not registered in the Tabu list (No at S42), the search control unit 140 registers a movement of the reference point of r0→r1 (S44). When an end condition for finishing the optimum allocation search process is not met, that is, the optimum allocation search process is re-performable (Yes at S46), the process from S22 to S44 is performed for the new reference point r1. The "end condition" means herein that a predetermined time, for example, 50 seconds passes since start of the optimum allocation search process or that the number of times of selecting reference points reaches a predetermined number of times, for example, is equal to or greater than 70. Alternatively, the end condition can be a time when the evaluation value E(r) exceeding a predetermined threshold value is detected. In any case, the end condition can be set arbitrarily according to design. When the end condition is met (No at S46), the search control unit 140 determines the use allocation rate r corresponding to the largest evaluation value E(r) at that point as the "optimum use allocation rate" (S48).

When the number of power supplies 300 is three or more, a similar basic idea to that described above can be applied. When the number of power supplies 300 is three or more, the optimum allocation search unit 130 searches the optimum use allocation rate while determining reference points based on combinations of the two variables of r and s. Since not all combinations are searched but a neighborhood search based on the Tabu search is made, it is possible to deduce a solution close to the optimum solution even when the solution is not optimum in a strict sense.

The multiple power supply integration system 200 according to the present embodiment has been described so far. The multiple power supply integration system 200 can stably supply the total power by regularly measuring the output of each power supply 300 and sets the use allocation rate so that the power supply 300 having stable output can be used more often than the power supply 300 having unstable output. The multiple power supply integration system 200 is configured to make it difficult to cause the sharp fluctuation in the total power since the power supply group 310 is controlled in view of not only the magnitude of the source power of each power supply 300 but also the stability thereof. In the multiple power supply integration system 200, the power supply group 310 complements insufficient power within the group, instead of causing a generator or the like to complement insufficient power as described in Japanese Patent Application Laid-Open No. 4-372528. Moreover, by applying the metaheuristic solution to the method of searching the optimum use allocation rate, it is possible to easily deduce the use allocation rate close to the optimum use allocation rate within the finite calculation time even when the multiple power supply integration system 200 is complicated in configuration. Therefore, it is possible to adjust the use allocation rate at an appropriate time by repeating measurement and calculation within a short time of about 1 minute.

The power supplies 300 are not always a mixture of different types such as the solar cell 302 and the wind power generation 304. When wind power generators are installed in, for example, Choshi-city, Ichihara-city, and Tateyama-city in Chiba prefecture of Japan, respectively, the generators are considered to differ in source power and/or stability despite the same type of the power supply. Due to this, the power supplies 300 controlled by the multiple power supply integration apparatus 100 can be a combination of power supplies 300 of the same type such as a plurality of wind power generations 304.

As the method of calculating the evaluation value $E(r)$, various methods are applicable other than the method using the Equations (1) to (3). For example, it is possible to determine, as the optimum use allocation rate, the use allocation rate r for which normalized value $uS(r)$ of the total stabilization predicted value is the largest among the use allocation rates r for which the normalized values $uP(r)$ of the total power predicted values are equal to or larger than 0.5. The evaluation method can be customized according to requirements for the multiple power supply integration system 200.

When the number of power supplies 300 is considerably large, the power supply group 310 can be divided into subgroups. First, a total power predicted value and a total stabilization predicted value are calculated for each subgroup. The optimum use allocation rate is calculated for the power supplies 300 in each subgroup. Based on these predicted values, the total power predicted value and the total stabilization predicted value for the entire power supply group 310 and the optimum use allocation rate for each subgroup are calculated.

For example, it is assumed that the power supply group 310 is divided into two subgroups, that is, a subgroup A and a subgroup B. The total power predicted value $UP(r)$ and the total stabilization predicted value $US(r)$ for the subgroup A are calculated, and the evaluation value $E(r)$ is thereby measured. As a result, an optimum use allocation rate rA in the subgroup A is determined. The calculated total power predicted value $UP(r)$ and total stabilization predicted value $US(r)$ for the subgroup A are assumed as $UPA(rA)$ and $USA(rA)$, respectively. Likewise, an optimum use allocation rate rB is determined, and a total power predicted value $UPB(r)$, and a total stabilization predicted value $USB(r)$ are calculated for the subgroup B. Next, assuming that a use allocation ratio of a combination of the subgroups A and B is R, $RA=UPA(rA)$, $PB=UPB(rB)$, $SA=USA(rA)$, and $SB=USB(rB)$, an evaluation value $E(R)$ is calculated using the Equations (1) to (3). The use allocation rate R corresponding to the largest evaluation value $E(R)$ can be determined as the use allocation rate of each of the subgroups A and B. By using this method, it is possible to efficiently reduce a calculation amount when the number of power supplies 300 is considerably large.

The present invention has been described above based on an exemplary embodiment. It should be readily understood by those skilled in the art that the above embodiment is only exemplary, various modifications can be made based on combinations of the constituent elements and processes mentioned above, and these modifications are also included in the scope of the present invention.

What is claimed is:

1. A multiple power supply integration apparatus comprising:
    a measurement unit that acquires an electric energy output within a unit time and stability indicating how small a change of electric power in the unit time is, from each of a plurality of irregular power supplies, outputs of the plurality of irregular power supplies having irregularity;
    an optimum allocation search unit that calculates an evaluation value serving as an index indicating the stability of supply of the electric power of the entire plurality of irregular power supplies while changing a use allocation rate of the plurality of irregular power supplies, based on the acquired electric energy and the acquired stability; and
    an allocation control unit that sets the use allocation rate of the plurality of irregular power supplies to a use allocation rate when an evaluation value satisfying a predetermined condition is calculated,
    wherein the optimum allocation search unit calculates the electric energy output and stability per unit time of the entire plurality of irregular power supplies using the use allocation rate as a variable, and calculates the evaluation value using an evaluation function defined so that the evaluation value is larger as each of or one of the electric energy output and stability per unit time of the entire plurality of irregular power supplies is larger or higher.

2. The multiple power supply integration apparatus as claimed in claim 1, wherein the optimum allocation search unit searches the use allocation rate corresponding to the largest evaluation value by applying an optimization method based on metaheuristics to the evaluation function using the use allocation rate as a variable.

3. The multiple power supply integration apparatus as claimed in claim 1, wherein the irregular power supply is a power supply derived from renewable energy.

4. The multiple power supply integration apparatus as claimed in claim 1, wherein the measurement unit regularly acquires the electric energy output and stability of each irregular power supply, and when the electric energy output and stability of each irregular power supply are acquired, the optimum allocation search unit searches the optimum use allocation rate based on the acquired electric energy output and stability.

5. The multiple power supply integration apparatus as claimed in claim 1, wherein the optimum allocation search unit normalizes the electric energy output and the stability to dimensionless values, respectively, and calculates the evaluation value using an evaluation function defined so that the evaluation value is larger as an average value of the normalized value of the electric energy output and that of the stability per unit time of the entire plurality of irregular power supplies is larger.

6. The multiple power supply integration apparatus as claimed in claim 1, wherein the optimum allocation search unit normalizes the electric energy output and the stability to dimensionless values, respectively, and calculates the evaluation value using an evaluation function defined so that the evaluation value is larger as the lower one of the normalized value of the electric energy output and that of the stability per unit time of the entire plurality of irregular power supplies is larger.

7. A multiple power supply integration system comprising:
- a plurality of irregular power supplies, outputs thereof having irregularity;
- a common power line, electric power being supplied thereto from the plurality of irregular power supplies; and
- a multiple power supply integration apparatus that determines a use allocation rate of the plurality of irregular power supplies, and adjusts electric power supplied from each of the irregular power supplies to the common power supply according to the use allocation rate, wherein the multiple power supply integration apparatus comprises:
- a measurement unit that acquires electric energy output within a unit time and stability indicating how small a change in the electric power within the unit time is, from each of the plurality of irregular power supplies;
- an optimum allocation search unit that calculates an evaluation value serving as an index indicating the stability of supply of the electric power of the entire plurality of irregular power supplies while changing the use allocation rate of the plurality of irregular power supplies, based on the acquired electric energy and the acquired stability; and
- an allocation control unit that sets the use allocation rate of the plurality of irregular power supplies to a use allocation rate when an evaluation value satisfying a predetermined condition is calculated, and wherein the optimum allocation search unit of the multiple power supply integration apparatus calculates the electric energy output and stability per unit time of the entire plurality of irregular power supplies using the use allocation rate as a variable, and calculates the evaluation value using an evaluation function defined so that the evaluation value is larger as each of or one of the electric energy output and stability per unit time of the entire plurality of irregular power supplies is larger or higher.

* * * * *